United States Patent [19]

Osder

[11] 4,162,438

[45] Jul. 24, 1979

[54] DUAL SERVO AUTOMATIC PILOT WITH IMPROVED FAILURE MONITORING

[75] Inventor: Stephen S. Osder, Scottsdale, Ariz.

[73] Assignee: Sperry Rand Corporation, New York, N.Y.

[21] Appl. No.: 890,745

[22] Filed: Mar. 27, 1978

[51] Int. Cl.² ............................................. G05B 9/02
[52] U.S. Cl. ................................... 318/564; 318/616; 244/194
[58] Field of Search ............... 318/616, 617, 618, 564, 318/565; 244/194, 195

[56] References Cited

U.S. PATENT DOCUMENTS

| | | | |
|---|---|---|---|
| 3,504,248 | 3/1970 | Miller | 318/561 |
| 3,719,878 | 3/1973 | Ferguson et al. | 318/565 |
| 4,035,705 | 7/1977 | Miller | 318/564 |
| 4,094,481 | 6/1978 | DeWalt | 318/564 X |

*Primary Examiner*—B. Dobeck
*Attorney, Agent, or Firm*—Howard P. Terry; Albert P. Cefalo

[57] ABSTRACT

The servomotor outputs of two substantially identical servo channels, are connected through a differential mechanism to position an attitude control surface of an aircraft in response to common or separate, normally identical, command signals applied to the respective channels. Position and rate feedback means responsive to the movement of the control surface and each servomotor provides position and rate feedback signals to their respective channels. The primary position rate feedback term for each servomotor channel is derived from the position feedback means rather than from a servo tachometer to increase the stiffness of the output in resisting the motions commanded by a failed servo channel and to improve fault detection capability by increasing the difference velocity between a good and a failed channel. Improved electrical equalization means, to allow more effective or lower velocity mismatch between the two servo channel motors, is provided wherein the equalization includes limits, which are varied in response to the input command. Also, monitoring with fault isolation is provided employing an estimate of surface position whereby the system is provided with fail operational characteristics.

13 Claims, 9 Drawing Figures

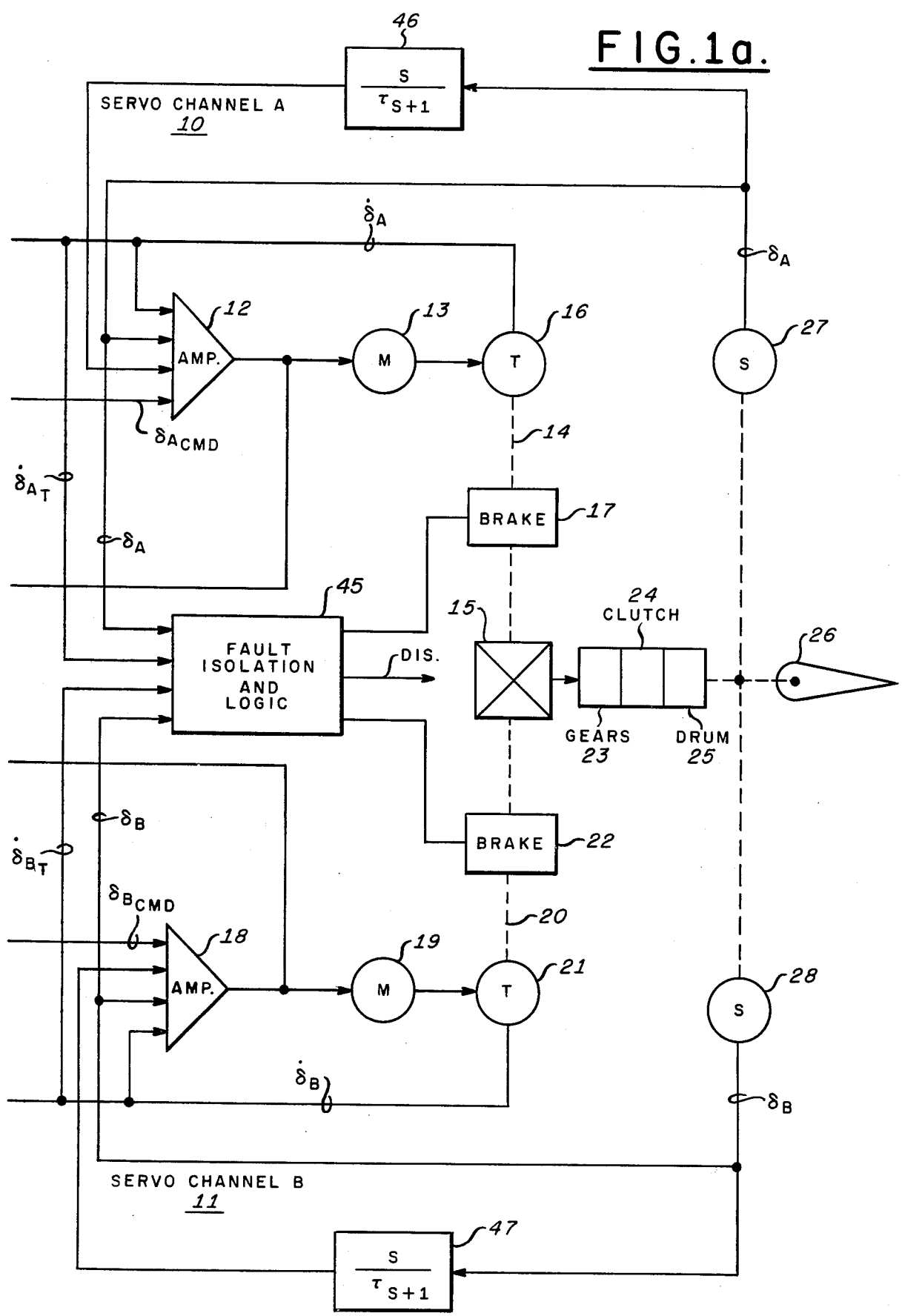

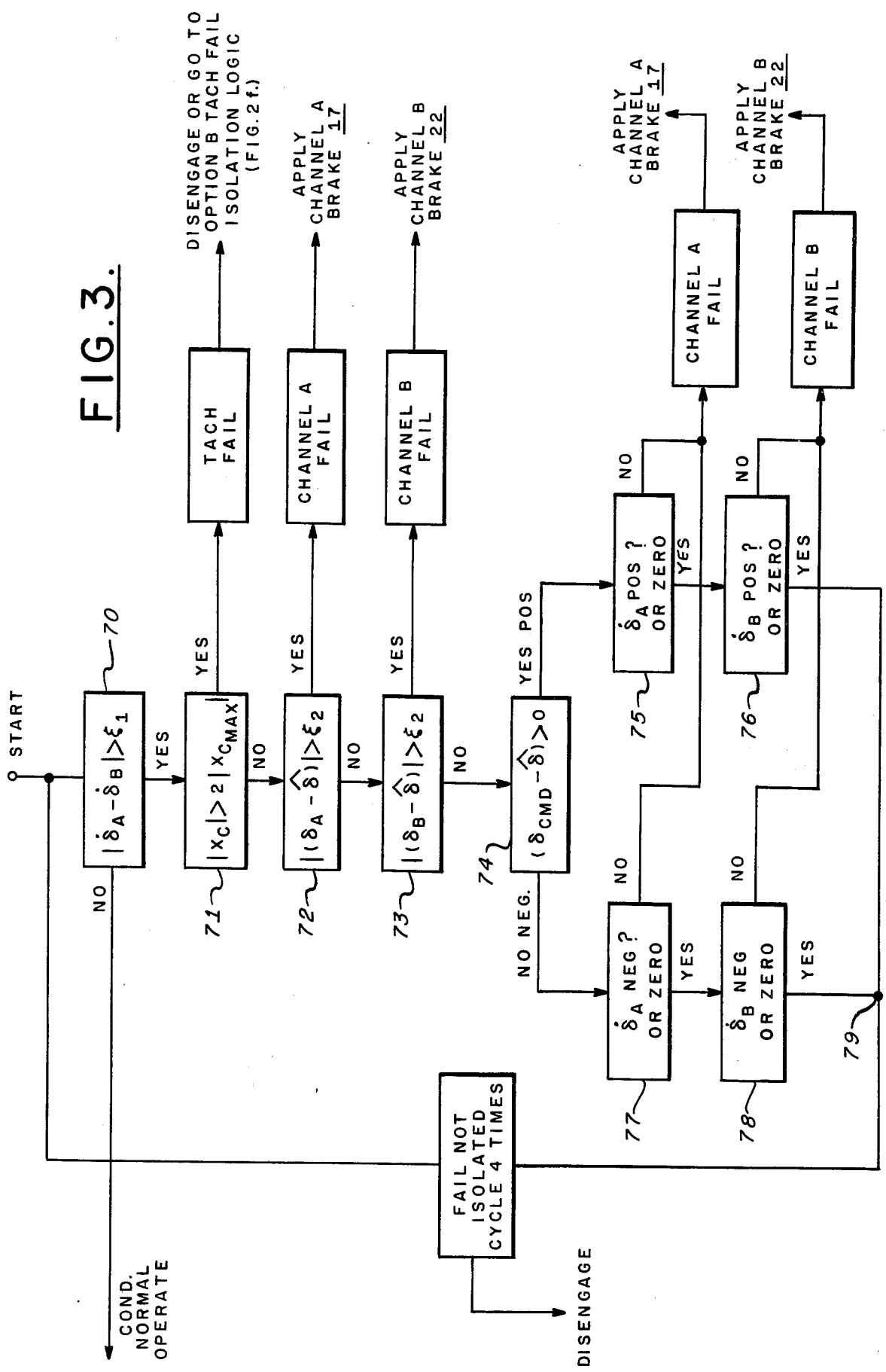

DUAL SERVO AUTOMATIC PILOT WITH IMPROVED FAILURE MONITORING

CROSS REFERENCES TO RELATED CASES

The present invention is closely related to the present applicant's copending application Ser. No. 890,426 filed concurrently herewith and entitled "Dynamic Equalization System for Dual Channel Automatic Pilot," said application being assigned to the assignee hereof.

BACKGROUND OF THE INVENTION

1. Field of the Invention

The present invention relates to automatic flight control systems for aircraft and, more particularly, to dual channel control systems having improved feedback means and improved monitoring means to substantially eliminate output transients due to failure of one of the channels.

2. Description of the Prior Art

Dual channel servo actuator systems having their outputs driving a common load through a differential gearing are known in the prior art and are exemplified by the systems described in applicant's assignee's pending U.S. patent application Ser. No. 811,653 entitled "Fail Passive Dual Servo with Continuous Motor Speed and Acceleration Monitoring" by M. T. DeWalt, filed June 30, 1977 and applicant's assignee's U.S. Pat. Nos. 3,504,248 and 4,035,705, entitled "Dual Channel Servo System Having Torque Equalization" and "Fail Safe Dual Channel Automatic Pilot with Manuever Limiting," respectively, issued on Mar. 31, 1970 and July 12, 1977, respectively, both by H. Miller. A further example of the prior art is U.S. Pat. No. 3,462,662 entitled "Monitoring and Fault Correction System for a Multiple Channel Servo Actuator," which issued on Aug. 19, 1969 in the name of W. E. Carpenter.

These dual channel control systems comprise two servo channels each including an electric servomotor driven by a servo amplifier to provide first and second outputs to the inputs of a differential gear, the output of which drives the output load or control surface. Position sensor and tachometer generators are coupled to the output of the differential gear and to the motor shaft, respectively, to provide position and rate feedback signals to the input of the associated servo amplifier. The torque transfer characteristics of the differential are such that movement of the output member or control surface caused by a failure in one of the channels is prevented or minimized by movement of the output of the other or "good" servo channel, thereby minimizing undesired transient maneuvers of the craft in response to such failure. The desired characteristic of the differential gear velocity summing mechanism is to cause a failed servo to back drive the good servo in an opposite direction thereby resulting in zero output movement. This characteristic will be provided inherently by the differential gear mechanism only if the output load resistance is greater than the resistance of the good servomotor. The output load member is made to appear stiffer by high gain position feedback derived from the output side of the differential summing mechanism. The position sensor of the "good" channel must respond to a control surface output caused by the failed channel such that it activates its servo channel's motor in a reverse sense such that the resultant output to the control surface is minimized. Thus, a failure in order to be compensated by the dual channel system, must necessarily propagate some disturbance to the control surface or load member. In addition, it is noted that the "good" channel's rate feedback means, i.e., its tachometer, normally provides a damping function which necessarily opposes the "good" motor's speed build-up during compensation of the failure. Accordingly, it is noted that although various monitoring systems are included in the prior art to detect a failure and disengage both channels for fail-passive operation or to isolate a failure and brake or clamp the failed channel, a failure in a channel may propagate a substantial undesired output to the control surface before the "good" channel comes up to speed and before the monitoring systems may react to clamp or brake the failed channel. At cruise altitudes, such a disturbance may be inconsequential. However, certain flight conditions, for example, during a final approach or landing flare-out maneuver, such a disturbance may produce a serious flight path departure and jeopardize a safe landing.

Accordingly, it is desirable to provide a control system with means to rapidly compensate for a servo channel failure such that substantially no surface output or attitude transient is developed. In addition, it is desirable to provide a fault isolation capability to isolate the failed servo channel and insure the integrity of the good control system in a fail operational manner.

SUMMARY OF THE INVENTION

In accordance with the present invention, a dual servo automatic flight control system is provided which substantially reduces the output to the control surface due to a failure in one of the servo channels thereby substantially decreasing any output transients. The present invention includes a dual servo system comprising first and second closed loop servo channels each including an electromechanical servomotor coupled through a differential gear and each channel having rate sensing means effectively responsive to the movement of the control surface to thereby increase the position stiffness of its servo control loop thereby rapidly compensating a failure by increasing the rate of response of the "good" channel's motor.

More specifically, the present invention comprises a dual channel control system, the output of each channel being combined in a mechanical summing device or differential gear to position the attitude control element of an aircraft in response to a common command signal applied to both channels. The dual channel system includes position and rate feedback means responsive to the control surface movement and if desired to the velocity of the respective channel's servomotor. In a preferred embodiment, the rate feedback means is responsive to the position sensor and provides a derived rate feedback signal, indicative of the rate of movement of the output member. In addition, electrical equalization means is utilized between the two channels in a manner which requires their motors to track each other in a constrained manner. This equalization means includes limiting means wherein the limits are varied as a function of the surface command signal magnitude. Furthermore, fault isolation and brake logic means is included which provides an estimate of output surface position for comparison with the actual position to insure the integrity of the control system, monitors which isolate the failed channel and to clamp the failed channel thereby providing a fail operational capability to the system.

BRIEF DESCRIPTION OF THE DRAWINGS

FIGS. 1A and 1B together illustrate in block diagram a preferred embodiment of the present invention in connection with a dual channel automatic flight control system;

FIG. 3 illustrates in flow chart format the logic of the fault isolation and clamping diagrams of FIGS. 2A through 2F.

DESCRIPTION OF THE PREFERRED EMBODIMENT

The present invention is utilized with dual channel servosystems that combine the outputs of the two channels to position an attitude control surface of an aircraft in response to a common command signal applied to both channels, or to dual redundant input command signals applied respectively to the channels. A property of such dual channel servosystems utilized advantageously in the invention is that motion of the attitude control surface that would be caused by a failure in one channel is compensated by motion of the other channel in response thereto. Such systems utilize individual electromechanical servo actuators whose outputs are combined by a motion summing meachnism of the differential gear type. Applicant's assignee's U.S. Pat. No. 3,504,248 referred to hereinabove describes the basic over-all functioning of such a dual servo system.

The present invention is an improvement over similar dual channel servo systems disclosed in the above-mentioned Miller U.S. Pat. Nos. 3,504,248 and 4,035,705, as well as in said Ser. No. 811,653. As described in both of these patents and patent application, the failure compensation property is inherently obtained because the differential gear mechanism thereof is utilized at a reversible point in the system to combine and couple the motions of the two rotary servomotors of the servo channels to the control surface. It is the inherent property of a mechanical differential that it will transmit to one of its members the weaker of two torques applied at its other elements. In the preferred embodiment hereindescribed, the closed loop rate term for each channel is derived from the differential output, i.e., control surface position, and thereby increases the position stiffness of the one servo channel and to minimize transients of the output member due to a failure of the other channel. Another feature of this invention provides a new and improved equalization subsystem having dynamic equalization limits, i.e., limits which are varied in accordance with the magnitude of the system's command signal. In addition, a further feature of this invention provides an improved fault isolation subsystem which insures the integrity of the sensors by means of a created third position estimate of the output member's position to provide the automatic control system with a fail-operational capability.

Figure 1B:
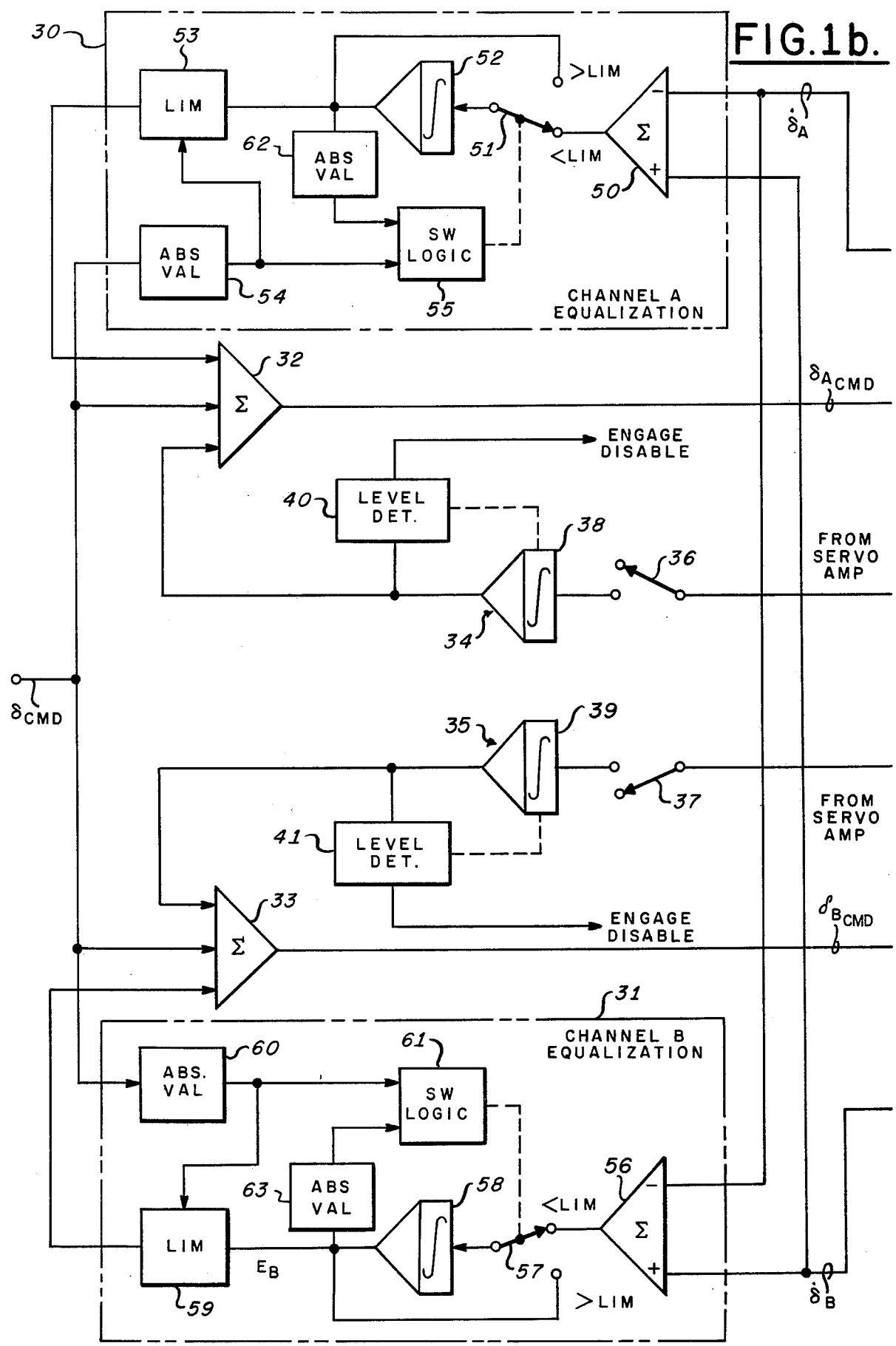

Referring now to FIGS. 1A and 1B of the drawings, the dual channel servo system is substantially as disclosed in the above identified patents and application. As the structure and operation of the basic stabilization and control of the present system is the same as and fully described in the above references, it will only be briefly discussed herein for continuity. The dual channel servo system is comprised of a first closed loop servo channel A and an identical second closed loop servo channel B. The A servo channel is responsive to a command signal $\delta_{ACMD}$ and includes a servo amplifier 12 which energizes an electromechanical servomotor 13 in response to the command signal. The servomotor 13 is coupled to an output shaft 14 to provide one input to a reversible mechanical differential 15. A tachometer generator 16 may be coupled to the shaft 14 and is normally integral with the servomotor 13. The tachometer generator 16 measures the velocity of the output of the servomotor 13. The velocity output of the tachometer generator 16 is applied in conventional rate feedback fashion to an input of the servo amplifier 12 at a predetermined gain to provide speed stability to the motor and this signal is also utilized for other purposes in accordance with the present invention in a manner to be later described.

The output shaft 14 of the servo channel A 10 may be clamped by a brake 17 which is preferably instrumented as an electrical brake of a type which is spring released to its clamped position when the power is removed from the brake solenoid. The brake 17 may be of the type described in U.S. Pat. No. 3,504,248 but is activated in accordance with the present invention in a manner to be hereinbelow described.

The servo channel B 11 includes respective components substantially identical to the components 12 through 14 and 16 and 17 of the servo channel 10 and are designated by the reference numerals 18 through 22, respectively.

The mechanical differential gear 15 algebraically sums the velocities of the servomotors 13 and 19 and provides the summed or resultant velocity through associated power gears 23, an electrical autopilot engage clutch 24, and a cable and drum assembly 25, to actuate a control surface 26 in the same manner as described in the referenced Miller patents. It will be understood that the output of the cable and drum assembly 25 may be used to control a boost actuator which actually positions the control surface.

The position of the control surface 26 as controlled by the output from the duplex servo through the differential gear 15 is measured redundantly by servo position sensors 27 and 28, such as synchro transducers, coupled thereto at a point between the clutch 24 and the control surface 26 by appropriate mechanical coupling. The synchros are excited by completely isolated power sources not indicated on the drawings. The output of each of the synchros or sensors 27 and 28 represents the actual position of the control surface 26 and are indicated by the legend $\delta_A$ and $\delta_B$, respectively, in the drawings. These signals are utilized as independent servo position feedback signals to the servo channels A and B, 10 and 11, respectively, through their respective summing amplifiers 12 and 18. These servo position signals $\delta_A$ and $\delta_B$ from the sensors 27 and 28 are also utilized in the fault isolation and logic portion of the present invention in a manner to be later described.

As indicated in the above-referenced patents, a significant characteristic of the reversible mechanical differential gear 15 having two sources of torque applied to the inputs thereof from the servo output shafts 14 and 20 is that the differential gear 15 equalizes the net torque output requiring each of the motors 13 and 19 to generate nearly identical values of torque as seen at the differential inputs 15. Should one servo tend to generate more torque than the other, the differential 15 causes the motors 13 and 19 to rotate at different speeds. The inherent torque equalization characteristics of the dual servo configuration as explained above and in the above-referenced patents may cause equal and opposite rotations of the motors 13 and 19 in the presence of normally expected spurious signals due to servo amplifier unbalance and differences in the gradients and nulls of the stability and path command signals of the two channels. Accordingly, equalization means is utilized between the two channels in a manner which forces the motors 13 and 19 to track each other with regard to speed and direction thereby providing adequate control authority of the servomotors. In accordance therewith, the outputs $\delta_A$ and $\delta_B$ (shown in the drawings) of the tachometer generators 16 and 21 respectively are both applied as inputs to equalization means 30 and 31 designated as Equalizer A and Equalizer B in FIG. 1B. The polarities of the tachometer signals $\delta_A$ and $\delta_B$ are applied to the equalizer circuits 30 and 31 as shown in the drawing and in a manner to be herein explained such that the speeds and directions of rotation of the motors 13 and 19 are forced to track each other as long as the equalization signals are within specified dynamic limit values. That is, the dynamic limit values are varied as a function of the commanded position signal ($\delta_{CMD}$) as will be described below.

The equalization signals from the circuits 30 and 31 are applied to summing amplifiers 32 and 33 and are summed with the command signal $\delta_{CMD}$ to be provided as the $\delta_{ACMD}$ and $\delta_{BCMD}$ signals to the respective servo amplifiers 12 and 18. The outputs from the servo amplifiers 12 and 18 are each respectively coupled through a synchronization circuit 34 and 35 through an engage/disengage switch 36 and 37, respectively. The input to the synchronization circuit is coupled through an integrator 38 and 39, respectively, to respective summing amplifiers 32 and 33. The synchronization signal which is fed back to the servo amplifiers 12 and 18, respectively, nulls the amplifiers prior to engagement of the control system. That is, brings the output therefrom to zero, thereby nulling any initial signals to the motors 13 and 19 which would otherwise occur because of tolerances of the position feedback transducers, servo amplifier unbalance, and the like. The synchronization signal provides the necessary nulling signal to balance the servo amplifiers 12 and 18, but of greater importance, it verifies that most of the elements of the servo system are functioning properly. That is, inability to synchronize out an excessive level, as determined by level detectors 40 and 41 is indicative of a servo amplifier failure and a disable signal therefrom disables the system. Furthermore, when the control system is engaged the switches 36 and 37 disconnect the output from amplifiers 12 and 18 to the integrators 38 and 39 such that only the nulling signals at the integrators are coupled to the amplifiers 32 and 33.

A fault isolation and brake logic means 45, FIG. 1A, responsive to the position sensors 27 and 28 and the tachometer generators 16 and 21 is provided to disengage the system or apply a braking signal to the brakes 17 or 22 in a manner to be herein described and to provide the system with a fail-operational capability.

As indicated above, a characteristic of a reversible mechanical differential fed by two sources of torque is that the differential will equalize or "vote" the two torques, and should one source of torque tend to generate more torque than the other source, the differential will cause the two motors to rotate in opposite directions with a net torque output that is the lesser of the two input torques. This inherent torque loading of the differential results in the unique fail-passive failure characteristics of the duplex servo configuration. However, it has been found that by increasing the position stiffness of the output member, transients are minimized and in the event of a failure, such as a hardover failure of one channel, the remaining or "good" channel will respond much more rapidly to initiate the required opposite or compensating servomotor response. In accordance with the preferred embodiment of this invention, this objective is obtained by means of a rate taker 46 and 47 responsive to the output of surface position transducers 27 and 28, respectively, the output of which is connected to the servo amplifiers 12 and 18 in typical feedback manner. The rate taker means 46 and 47 provide a derived rate feedback signal of the movement of the output member 26 which increases the position stiffness of the "good" servo to provide rapid servo response to control surface movement. Accordingly, in the event of a failure of one of the servo channels, such as 10, for example, the inherent characteristic of the system results in a small initial output at the control surface 26 which moves the "good" channel transducer 28, the rate of such movement being sensed by the rate circuit 47. This surface rate signal is applied as a high gain signal to servo amplifier 18 to rapidly drive the servomotor 19 in a direction and at a velocity opposite to that of servomotor 13 to thereby cancel the output of the differential 15 to the member 26 and minimize the transient. It is noted that in the preferred embodiment of the invention, the derived rate term is the primary velocity feedback of each of the closed loop channels. However, a percentage (in the preferred embodiment approximately 5%) of the tachometer generator signal $\delta_A$ and $\delta_B$ may be used for inner loop damping and for high motor speed stability.

Referring now to FIG. 1B, the equalization circuits 30 and 31, responsive to the servo rate outputs from the tachometer generators 16 and 21, provide equalization signals to the summing amplifiers 32 and 33, respectively, as indicated above. As indicated in the above-referenced patents, although both motors 13 and 19 will normally track each other, normal tolerances in the position feedback synchro gradients causes small velocity differentials between the motors which tend to increase for larger surface (output member) commands. In order to reduce this velocity differential, a constrained integration equalization signal $E_A$ and $E_B$ is applied to the summing amplifiers 32 and 33 in a manner herein described. Referring now to equalizer A 30, the tachometer signals $\delta_A$ and $\delta_B$ are applied as inputs to summing amplifier 50 with the polarity as shown, wherein the difference in the outputs of the tachometer generators 16 and 21 is coupled through control switch 51 to equalization integrator 52. The output of the equalization integrator 52 is limited by limiter circuit 53 and is applied as an input to the summing amplfier 32. It is noted that the integrator 52 tends to correct for the difference in the velocities ($\delta_A$ and $\delta_B$) and were it not for the limiter circuit 53, the failure of one channel would be propagated into the remaining or "good" channel. It is further noted that the limit on the total equalization signal represents approximately the magnitude required to correct for the normal tolerances in the position synchros' gradient mismatch, which is variable according to the input. For this reason, the limit on the equalization signal of the instant invention is made a function of the absolute value of the surface command signal magnitude $|\delta_{CMD}|$ and, therefore, equalization need only equalize to the maximum tolerance build-up in the servo loop independent of command signal magnitude. Thus, the equalization limit is a function of displacement and may be represented by the expression $$b_1|\delta_{CMD}|+b_2 \qquad (1)$$

where $b_1$ and $b_2$ are tolerance threshold constants. The equalization signal $E_A$ from the integrator 52 is coupled through a limiter circuit 53 such that the limited value $E_A$ of the equalization signal is coupled to the command signal summing amplifier 32. Following large surface commands ($\delta_{CMD}$), limiter 53 will be set for larger values than it would be for small surface commands. At such times the signal at the output of integrator 52, can be expected to be larger than it should be when surface commands are small. Thus, when the surface command returns toward zero or small values, the output of the equalization integrator 52 must be reduced. This reduction is accomplished through the switching logic means 55, an absolute value device 62, and the integration control switch 51. When the absolute value of integrator 52 output exceeds the value computed for limiter 53, switch 51 is commanded by the switching logic means 55 to switch to an integrator "disable" position designated on the figure by the notation >LIM. With switch 51 in the >LIM position, the integrator 52 signal decays exponentially toward zero. The gain of the signal path from the output of the integrator to its respective input determines the time constant of the decay. In the preferred embodiment of the invention, this decay time constant is approximately 0.5 seconds.

When the integration signal has decayed to an absolute value less than the value $b_1|\delta_{CMD}|+b_2$, this is sensed by switching logic means 55 and switch 51 is commanded back to the closed loop equalization integration position designated by "<LIM." The closed loop equalization integration is again enabled such that the equilibrium velocity difference $\dot{\delta}_A - \dot{\delta}_B$ between motors 13 and 19 is always forced to zero.

The equalization circuit 31 includes respective components substantially identical to the components 50 through 55 and 62 of the equalization circuit 30, which are designated by the reference numerals 56 through 61 and 63, respectively, and provides an equalization signal $E_B$ to summation amplifier 33.

Accordingly, the equalization signals $E_A$ and $E_B$ added to the respective summing amplifiers 32 and 33, may be represented by the equations $$E_A = \int_0^t [K(\dot{\delta}_B - \dot{\delta}_A) - ME_A] dt \qquad (2)$$

where
$K = k_1$ for $|E_A| \leq |E_A|_{LIM}$
$K = 0$ for $|E_A| > |E_A|_{LIM}$
$M = k_2$ for $|E_A| > |E_A|_{LIM}$
$M = 0$ for $|E_A| \leq |E_A|_{LIM}$ and $$E_B = \int_0^t [K(\dot{\delta}_A - \dot{\delta}_{BN}) - ME_B] dt$$

where K and M are as defined above except that $|E_B|$ is substituted for $|E_A|$.

The dual servo control system of FIGS. 1A and 1B includes monitor and fault isolation means 45 responsive to the tachometer generators 16 and 21 to monitor the velocity of the servomotors 13 and 19 in order to respond to a failure in their respective channels and brake the appropriate motor through brake means 17 or 22. That is, in a duplex servo system, a large differential velocity between the two motors 13 and 19 is indicative of a channel failure. Thus, if the differential velocity is monitored and does not exceed a predetermined threshold value, as determined by normal tolerances, the brake means 17 and 22 will not be activated. As described by the DeWalt application mentioned above, the differential velocity fault criterion may be used to disengage the servo system and the fail-passive requirements would be met. However, sufficient information exists in the system to isolate every fault in a failed channel, and in the autoland modes of the preferred embodiment of this invention, this information is advantageously used to make the servosystem fail-operative. Accordingly, the velocity modeling of the monitoring and fault isolation means 45 of FIG. 1A will be discussed in connection with the analog logic circuits of FIGS. 2A through 2F and the logic flow chart format thereof as shown in FIG. 3. As indicated above, when the differential velocity fault criterion 70 of FIG. 3 is established indicative of a failure, the monitoring means 45, to be fail operative, must identify which side has failed, shut down the appropriate channel and monitor the command signal and remaining "good" channel in a fail-passive manner. It is further noted that the velocity modeling technique of this invention also obtains its result through the recognition that a surface position error would cause a velocity response having a polarity in the direction of the position error polarity or zero velocity if the servomotor is torque saturated for a given position error. As a failure always results in a servomotor running in an incorrect direction, the fault isolation reduces to comparing the polarity of the tachometer generators 16 and 21 with the polarity of the surface position error, while also accounting for transducer failures. It is noted that as a transducer failure (tachometer or position sensor failure) may be the cause for the establishment of the differential velocity fault criterion, an "independent" signal is required for failure detection purposes. Accordingly, the monitor and fault isolation means 45 creates an estimated surface position signal $\hat{\delta}$ for comparison purposes in order to detect the failed channel as explained hereinbelow, reference being made to FIG. 2A.

Figure 2A:
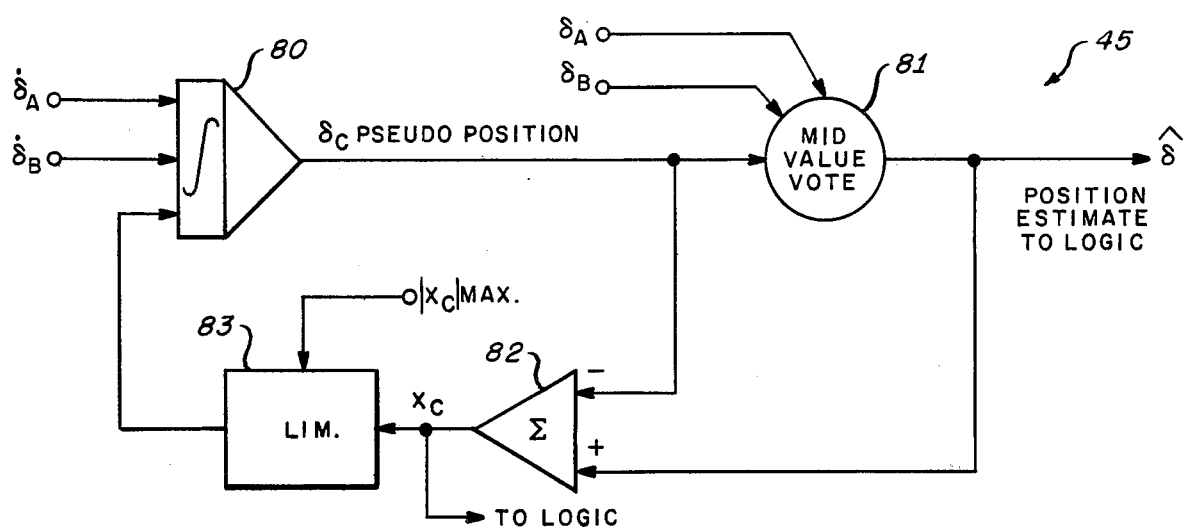
FIGS. 2A through 2F, inclusive, comprise in block diagram format the fault isolation and servo brake logic of the present invention.

In the following discussion, reference will be made to both FIGS. 2A–2F and to FIG. 3. As seen in FIG. 2A, the surface position estimate $\hat{\delta}$ is the mid value of transducer A, 27, position $\delta_A$ transducer B, 28, position $\delta_B$ and the integral of velocity $\dot{\delta}_A + \dot{\delta}_B$ computed by integrator 80. The mid value is selected by mid value voter 81. As the gradient tolerances of $\dot{\delta}_A$ and $\dot{\delta}_B$ and other biases in the position and velocity signals would normally cause a difference between $\delta_C$, the pseudo position output of integrator 80, and the surface transducers 27 and 28, it is desirable that these normal tolerance errors be eliminated from the pseudo position signal, $\delta_C$. This is done by closing the equalization loop shown in FIG. 2A by means of a summing means 82 and a limiter 83. The summing means 82 computes a signal equal to the mid value surface position estimate $\hat{\delta}$ minus the pseudo position $\delta_C$. This difference signal identified as $X_C$ is passed through the limiter 83 and summed in the integrator 80. The limiter is set at a value shown in FIG. 2A as $X_C$MAX which is selected as the value corresponding to the maximum tolerance error which can occur with properly functioning tachometers and surface position transducers.

Figure 2B:
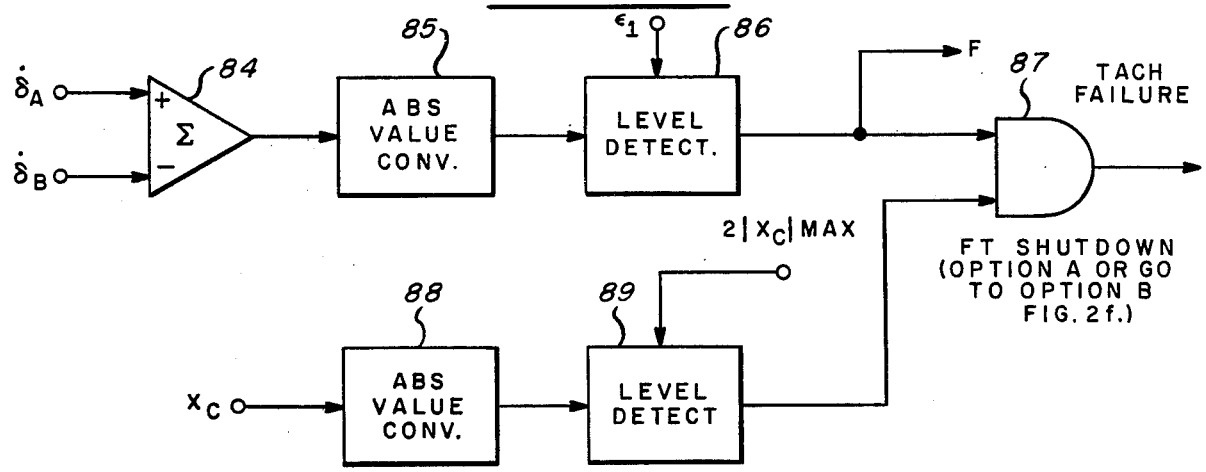

Referring again to FIG. 3, once the differential velocity error criterion element 70 indicates that the error threshold $E_1$ has been exceeded, a fault in the dual servosystem is established. The system logic then must examine all available signals to identify the source of the failure so that the faulty channel associated with this failure can be shutdown. Since the tachometer signals $\hat{\delta}_A$ and $\hat{\delta}_B$ are used in the fault detection logic, it must first be established that the fault which caused the differential velocity excessive error that was detected by element 70 was not the result of a tachometer failure. Any failure of a tachometer would cause it to read an incorrect motor velocity. If such a velocity measurement error occurred either in tachometer 16 or tachometer 21 of FIG. 1A, then the pseudo position signal $\delta_C$ would be erroneous. An error in $\delta_C$ is determined by the magnitude of signal $X_C$ which is equal to $\hat{\delta} - \delta_C$. The signal $X_C$ can be as large as $X_C MAX$ for worst case normal tolerance errors. A tachometer failure criterion therefore can be established on the basis of the differential velocity threshold $E_1$ being exceeded and the signal $X_C$ exceeding a second threshold established by element 71. To avoid polarity selection on the signals that are compared to these thresholds, absolute value conversions are made on the signals $(\hat{\delta}_A - \hat{\delta}_B)$ and $X_C$. In the preferred embodiment, the threshold of element 71 is made equal to $2|X_C MAX|$. The implementation of elements 70 and 71 of FIG. 3 is illustrated in FIG. 2B where $(\hat{\delta}_A - \hat{\delta}_B)$ is computed in a summing stage 84, applied to an absolute value means 85 and then applied to a level detector 86 which contains the $E_1$ threshold. If the $E_1$ threshold is exceeded, a failure state F is defined. If, at the same time, signal $X_C$ which is converted to an absolute value in a converter 88 and applied to a level detector 89, exceeds the $2|X_C MAX|$ threshold, then a tachometer failure is detected by an AND gate 87. Failure of a tachometer defines the FT state at the output of the AND gate 87.

If a tachometer failure has been diagnosed by the above-described logic, then two alternative strategies may be used. In one of these strategies identified as option A, it is acknowledged that a tachometer failure is a very rare event because of the relatively inherent high reliability of tachometer devices. This option commands a shutdown of both channels for a tachometer failure, thereby providing only a fail-passive capability for this type of failure. In option B, the system provides complete fail-operational capability by proceeding to a separate set of fault isolation logic which will identify which of the two tachometers has failed and will then shutdown the specific servo channel containing the failed tachometer. The mechanization of the failed tachometer fault isolation logic will be described subsequently with reference to FIG. 2F.

Figure 2C:
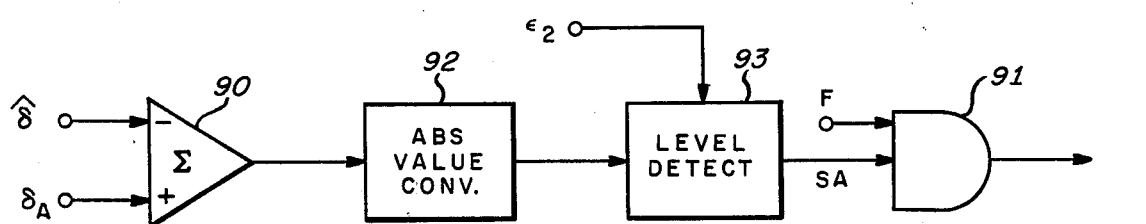
Figure 2C:
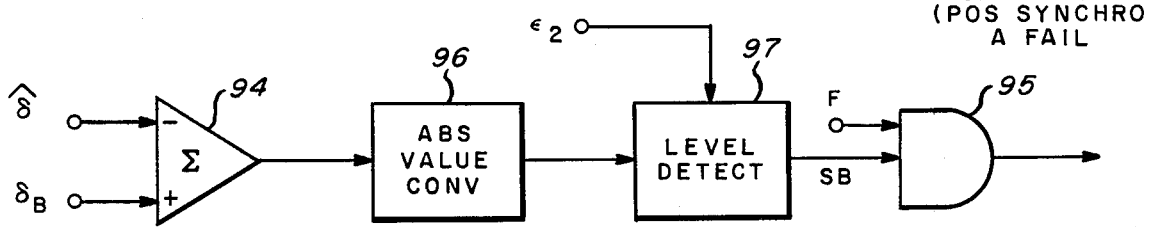

Consider now the isolation of more probable failed elements of the dual servosystem. If the fault indication has been established by logic 70 of FIG. 3 (equivalent to the F state output of the level detector 86 of FIG. 2B), and the tachometer failure logic 71 indicates that the tachometers are good, then the next fault isolation procedure is to verify that the position transducers 27 and 28 of FIG. 1A are good. This is performed by logic elements 72 and 73 of FIG. 3 or the equivalent implementation illustrated by FIG. 2C. As shown in FIG. 2C, transducer A signals $\delta_A$ is compared with the mid value estimate $\hat{\delta}$ in summing stage 90 and the difference is converted to an absolute value in means 92. The output of 92 is compared in a level detector 93 with a failure criterion threshold $E_2$. If it exceeds the threshold $E_2$, a failure of sensor $\delta_A$ is diagnosed by the generation of logic state SA as the output of level detector 93. The simultaneous occurrence of state SA and F at the AND gate 91 provides the fault isolation to channel A and the command to apply the shutdown brake to channel A. A similar process is performed for position transducer B's signal $\delta_B$ in a logic element 73 of FIG. 3 and its equivalent in a summing stage 94, an absolute value converter 96, a level detector 97 and an AND gate 95 of FIG. 2C. If signal $\delta_B$ exceeds the failure threshold $E_2$, logic state SB is generated which, when combined with failure state F, commands a shutdown of channel B by applying its brake 22.

Figure 2D:
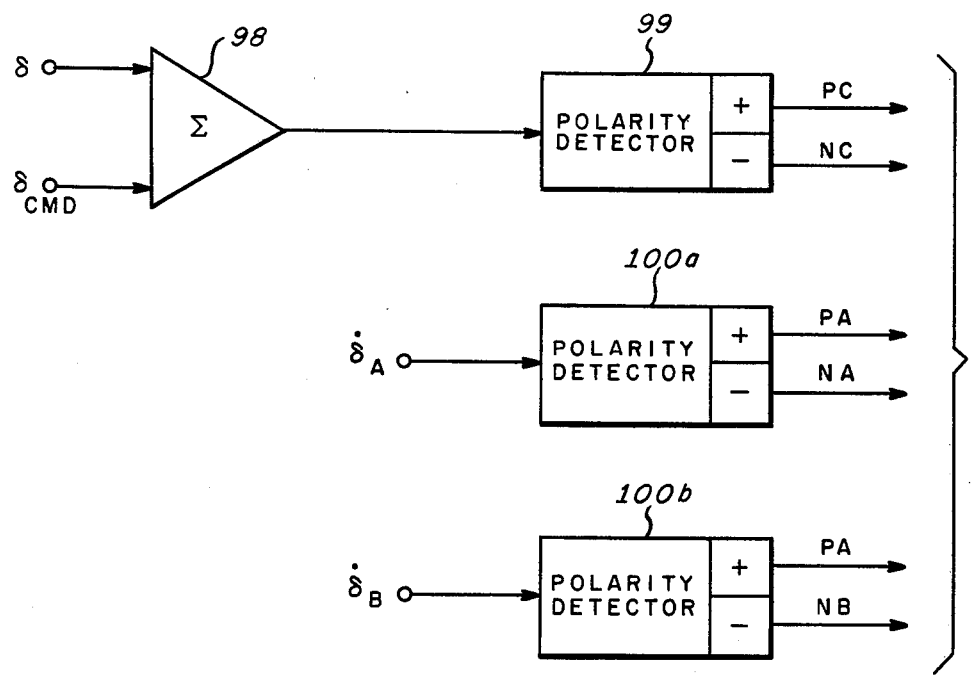
Figure 2E:
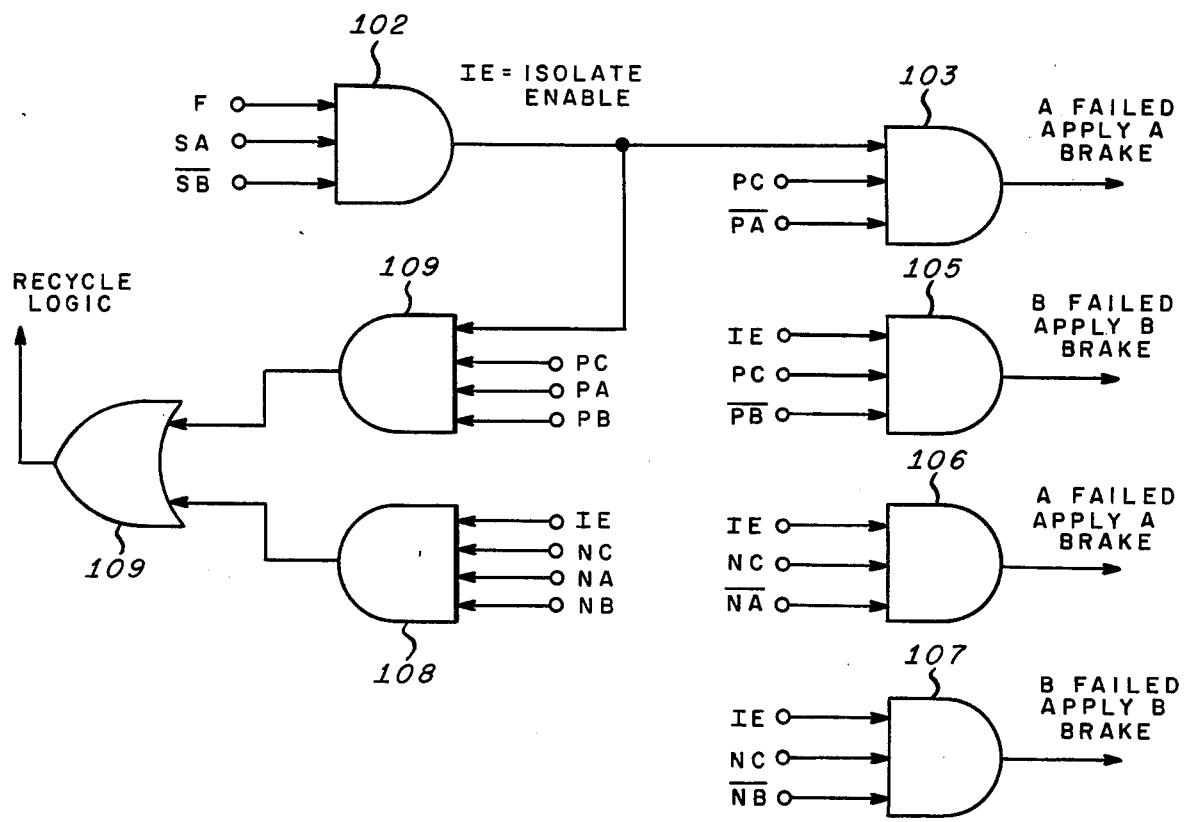

If a failure has been diagnosed in logic element 70 of FIG. 3 and the tachometer and position transducers have been found to be good by virtue of having passed through logic criteria in 71, 72 and 73 of FIG. 3, then it is known that the failure must have occurred in either the motor or servo amplification elements of the servosystem. The fault isolation logic must now find which channel has malfunctioned and apply the shutdown brake to that channel. This is accomplished by recognizing that the surface velocity for a properly functioning system must always have the same polarity as the position error signal. Thus, for channel A, $\hat{\delta}_A$ and $\hat{\delta}_B$ should have the same polarity as $(\delta_{CMD} - \hat{\delta})$. The isolation logic which accomplishes this is shown in FIG. 3 as logic elements 74, 75, 76, 77 and 78. The equivalent mechanization is illustrated in FIGS. 2D and 2E. Logic element 74 determines whether $(\delta_{CMD} - \hat{\delta})$ is positive or negative. This is shown mechanized in FIG. 2D by a summing stage 98 and a polarity detector 99 which outputs either a positive determination state, PC or a negative determination state, NC. If the positive state, PC is determined, then the polarity of the two tachometer signals $\hat{\delta}_A$ and $\hat{\delta}_B$ are tested for the same polarity in logic elements 75 and 76. If $\hat{\delta}_A$ is not positive, a channel A failure is diagnosed by element 75 and channel A brake is applied. If $\hat{\delta}_B$ is not positive, a channel B failure is diagnosed by element 76 and channel B brake is applied. If logic element 74 had determined that the position error were negative, then $\hat{\delta}_A$ and $\hat{\delta}_B$ would be tested to determine if they were negative by logic elements 77 and 78. If $\hat{\delta}_A$ is not negative in this situation, logic element 77 would have determined this condition and commanded shutdown of channel A. Similarly, if $\hat{\delta}_B$ were not negative, logic element would have commanded channel B to shutdown. There are no conceivable failures which would allow the fault diagnostic process to reach point 79 on FIG. 3 since this point corresponds to the situation that a velocity discrepancy or system fault was determined but all individual elements of the system were found to be functioning properly. For logical thoroughness, however, point 79 is recognized by causing the fault isolation logic to recycle. A counter keeps track of the number of recycle loops and if the number of recycles reaches 4, the system is shutdown.

The functional elements needed to implement the logic described by 74 through 79 are illustrated in FIGS. 2D and 2E. In addition to the $(\delta_{CMD} - \hat{\delta})$ polarity detector described previously, $\hat{\delta}_A$ and $\hat{\delta}_B$ polarity detectors are shown in FIG. 2D. Positive polarities produce state P and negative polarities produce state N with the A or B notation following these states to identify the A or B channel. In the preferred embodiment, these polarity detectors include a small deadzone around the zero signal amplitude to accommodate the signal bias tolerances in the tachometer. With this deadzone, the polarity logic is actually tri-state. The neither positive or negative case for both tachometers will reach the no decision point 79 in FIG. 3 but it will not produce any output diagnostic in the equivalent implementation diagram shown in FIG. 2E. In this figure, an AND gate 102 provides the "Isolate Enable" or IE state which is equivalent to reaching logic element 74 in FIG. 3. In FIG. 2E, an AND gate 103 provides the logical functions provided by element 75 of FIG. 3. Similarly, an AND gate 105 provides the function of logic element 76, an AND gate 106 provides the function of logic element 77 and an AND gate 107 provides the function of logic element 78. AND gates 108 and 109 provide the "YES" paths of logical elements 75, 76, 77 and 78 which lead to the indeterminate state (point 79) requiring recycling of the diagnostic logic.

Figure 2F:
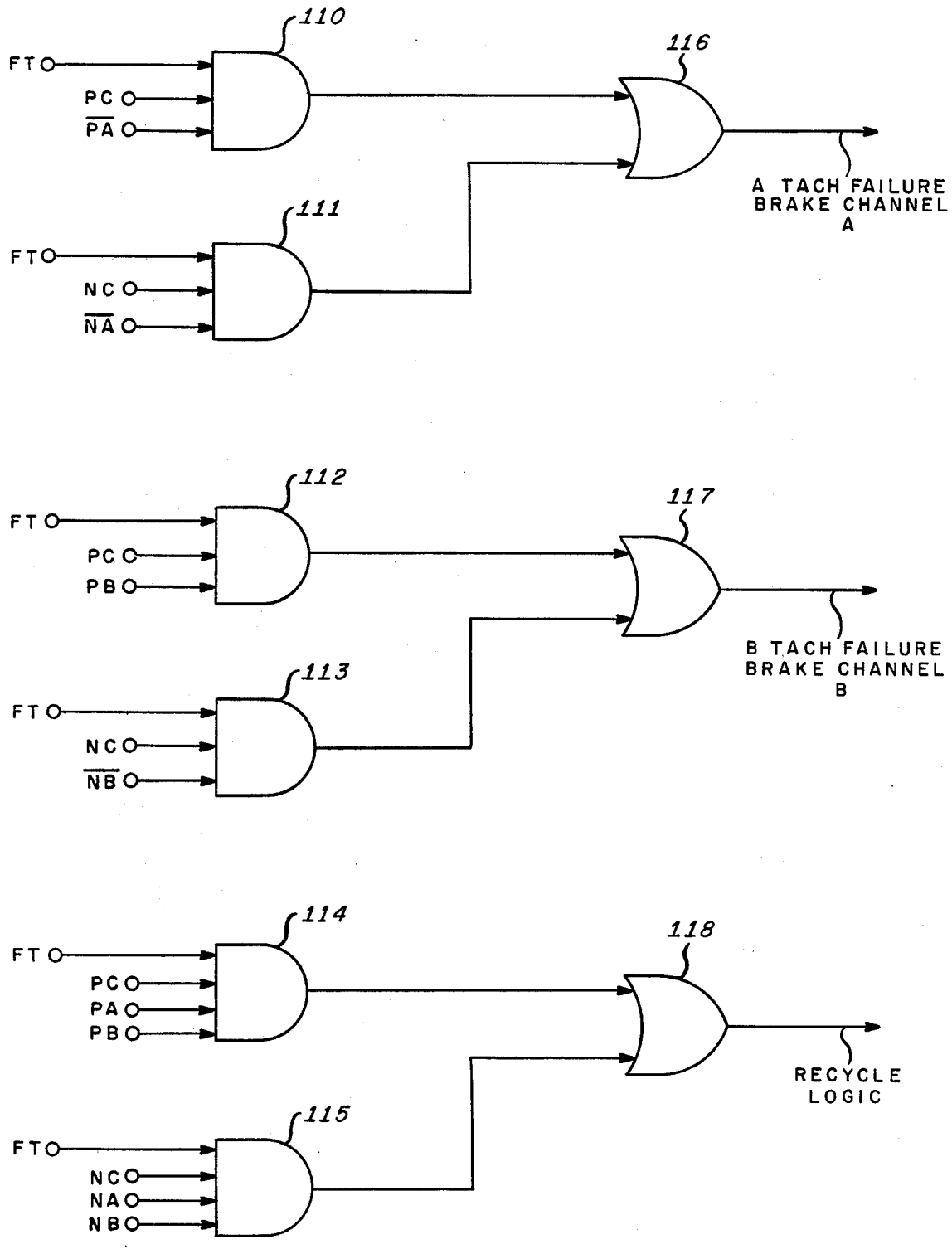

The fault isolation logic for tachometer failures, which has been identified as option B in FIG. 2B and in FIG. 3, will provide the information needed to shutdown the channel containing the failed tachometer, see FIG. 2F. The fault isolation strategy is based on the knowledge that the motor velocity should be in the direction of the position error as described previously. If the servosystem failure has been caused by a failure of a tachometer to measure velocity correctly, then that failed tachometer's signal will not agree in polarity with the position error.

Referring to FIG. 2F, logic is illustrated for isolating a particular tachometer failure. The monitoring fault isolation means 45 includes AND gates 110 through 115 having as one of their inputs the output from AND gate 87 of FIG. 2B, the other inputs of AND gate 110 include the positive polarity from polarity detector 99 and the inverse positive polarity from polarity detector 100 (see FIG. 2D). In like manner, the AND gate 111 includes as its other inputs the negative polarity from polarity detector 99 and the inverse negative polarity from polarity detector 100. The outputs of AND gates 110 and 111 are applied as inputs to an OR gate 116 and if either AND gate 110 or 111 is enabled, OR gate 116 is enabled to clamp channel A through brake 17 and indicate a channel A tachometer failure. In like manner, AND gates 112 and 113 are coupled to OR gate 117 to indicate a channel B failure and AND gates 114 and 115 are coupled to OR gate 118 for thoroughness in the event of a "no failure" in order that the test may be recycled, as previously described.

It will be apparent to those skilled in the art that although the equalization means and synchronization means of FIG. 1B and the monitor and fault isolation means of FIGS. 1A and 2A-2F are illustrated as analog logic solutions, it will be understood that the same logic may be implemented by a digital computer programmed conventionally in accordance with the logic flow diagram of FIG. 3.

It will now be appreciated that the dual channel, duplex servo automatic pilot described herein provides very rapid response to failures and minimizes output transients due thereto by using a rate feedback derived from position sensor signal rather than using the tachometer signals. In addition, the invention described herein includes improved equalization having dynamic limits responsive to the output members or control surface command position thereby permitting wider monitor tolerance levels and thereby avoiding nuisance trips. Furthermore, it will be appreciated that the monitored and fault isolated dual channel automatic pilot described herein provides fail operational capability and insures the integrity of the system by means of an estimated output position created to detect and isolate tachometer and position sensor failures after a single channel failure.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A dual channel servo control system for aircraft automatic pilots for positioning a control surface in accordance with an input command signal comprising
   first and second substantially identical servomotor channels responsive to said input command signal and including corresponding first and second servomotors each normally providing substantially identical first and second output motions in response to said command signal, each of said channels further including corresponding first and second tachometers for supplying first and second signals proportional to the velocity of its corresponding servomotor,
   differential means responsive to said first and second servomotor outputs and having an output coupled to position said control surface,
   feedback means responsive to said differential output for supplying first and second rate feedback signals to said first and second channels, respectively, such that upon failure of one of said channels said first and second tachometers supply servomotor velocity signals having a differential value that is large compared with the motion of said control surface, and
   monitoring means responsive to said first and second servomotor velocity signals for disabling the operation of said failed channel, said monitoring means having a failure detection threshold dependent at least in part upon a predetermined value of the difference between said first and second servomotor velocity signals.

2. A control system as set forth in claim 1 wherein said feedback means includes first and second position sensors for supplying corresponding first and second signals proportional to the position of said control surface to said first and second channels, respectively, and means responsive to said first and second position signals for deriving said first and second rate feedback signals.

3. A control system as set forth in claim 2 wherein said first and second tachometer velocity signals are fed back to their respective channels for further controlling their respective servomotors.

4. A control system as set forth in claim 3 wherein the gains of said derived rate signals is substantially larger than the gains of said tachometer velocity signals fed back to their respective channels.

5. A control system as set forth in claim 4 wherein the gains of said tachometer velocity signals supplied to said monitoring means is substantially larger than the gains of said tachometer velocity signals fed back to their respective channels.

6. The control system as set forth in claim 1 wherein each of said servomotor outputs includes braking means for arresting motion of said servomotor outputs to said differential means and said monitoring means actuates the braking means associated with the failed channel.

7. A control system as set forth in claim 2 wherein said monitor means provides a fail operational characteristic to said control system, said monitor means further comprising,
    computation and logic means responsive to said first and second position signals and said first and second tachometer signals for detecting a channel failure and for identifying said failed channel, and
    means responsive to said logic means for clamping the failed servomotor output to said differential means whereby the non-failed channel may continue to control said control surface.

8. A control system as set forth in claim 7 wherein said computation means includes
    integrator means responsive to said first and second tachometer signals for providing a computed third signal normally corresponding to the position of said control surface,
    means responsive to said first and second position signal and said third position signal for providing a signal corresponding to the mid value thereof,
    means responsive to the difference between said mid value signal and said third signal for providing an equalizing signal related to the normal tolerances of said position and tachometer sensor means,
    means including means responsive to a predetermined maximum value of said equalization signal to said integrator means for equalizing said third signal in accordance with said maximum tolerances.

9. The control system as set forth in claim 8 wherein said logic means includes
    means responsive to the difference between said tachometer signals and said equalization signal for providing a first logic signal, and
    further logic means responsive to said first logic signal and a signal corresponding to the sign of the difference between said mid value signal and said command signal for detecting a failure of one of said tachometers, and
    means responsive to said further logic means for clamping the servomotor output of the channel having the failed tachometer.

10. A control system as set forth in claim 8 wherein said logic means includes
    further logic means responsive to the difference between said mid value signal and one of said first and second position signals and a signal responsive to the difference between said tachometer velocity signals for detecting a failure of said one position signal, and
    means responsive to said further logic means for clamping the servomotor output of the channel having the failed position sensor.

11. A control system as set forth in claim 8 wherein said logic means includes
    further logic means responsive to the polarity of the difference between said mid value signal and said command signal and the polarity of one of said tachometer velocity signals for supplying polarity logic signals,
    additional logic means responsive to the difference between said tachometer velocity signals and the said further logic means for detecting a failure in one of said channels,
    and means responsive to said additional logic means for clamping the servomotor output of said one channel.

12. A control system as set forth in claim 1 further including equalization means coupled with each of said channels respectively responsive to the servomotor velocity signals of each channel for minimizing any velocity difference between the channels due to any normal mismatch between the components of each channel.

13. A control system as set forth in claim 12 wherein said equalization means further includes
    limiter means for limiting the maximum value of the velocity difference between said velocity signals, and
    means responsive to said command signal for varying the limits imposed by said limiting means in accordance therewith.

* * * * *